(12) United States Patent
Wolff et al.

(10) Patent No.: US 9,690,087 B2
(45) Date of Patent: Jun. 27, 2017

(54) METHOD AND APPARATUS FOR DEFINING A Z-RANGE IN A SAMPLE, IN WHICH A Z-STACK OF THE SAMPLE IS TO BE RECORDED BY MEANS OF A MICROSCOPE

(75) Inventors: Horst Wolff, Siegenburg (DE); Daniel Svejdar, Kirchdorf (DE); Markus Eichinger, Tuerkenfeld (DE)

(73) Assignee: Carl Zeiss Microscopy GmbH, Jena (DE)

( * ) Notice: Subject to any disclaimer, the term of this patent is extended or adjusted under 35 U.S.C. 154(b) by 642 days.

(21) Appl. No.: 14/117,350

(22) PCT Filed: Apr. 4, 2012

(86) PCT No.: PCT/EP2012/056210
§ 371 (c)(1),
(2), (4) Date: Nov. 12, 2013

(87) PCT Pub. No.: WO2012/156150
PCT Pub. Date: Nov. 22, 2012

(65) Prior Publication Data
US 2014/0232844 A1    Aug. 21, 2014

(30) Foreign Application Priority Data
May 13, 2011   (DE) .......................... 10 2011 075 809

(51) Int. Cl.
G02B 21/36    (2006.01)
G02B 21/00    (2006.01)
G02B 21/24    (2006.01)

(52) U.S. Cl.
CPC ......... *G02B 21/365* (2013.01); *G02B 21/006* (2013.01); *G02B 21/244* (2013.01)

(58) Field of Classification Search
CPC .............................. G02B 21/36; G02B 21/365
See application file for complete search history.

(56) References Cited

U.S. PATENT DOCUMENTS

| 5,594,235 A | * | 1/1997 | Lee ......................... G01N 21/94 250/201.3 |
| 5,647,025 A | * | 7/1997 | Frost ........................ G02B 7/28 250/201.3 |
| 5,932,872 A | * | 8/1999 | Price .................... G01N 15/147 250/201.3 |

(Continued)

FOREIGN PATENT DOCUMENTS

| EP | 2109753 B1 | 7/2008 |
| WO | 2008028745 A1 | 3/2008 |

OTHER PUBLICATIONS

International Preliminary Report on Patentability to the corresponding International Application No. PCT/EP2012/056210 rendered by The International Bureau of WIPO on Nov. 28, 2013, 16 pages (including English translation).

*Primary Examiner* — Jayanti K Patel
*Assistant Examiner* — Irfan Habib
(74) *Attorney, Agent, or Firm* — Skaar Ulbrich Macari, P.A.

(57) ABSTRACT

A method for defining a z-range in a sample in which a z-stack of the sample is to be recorded by means of a microscope is provided, wherein the z-range is defined automatically on the basis of a z-value situated in the sample and taking at least one predetermined parameter into account.

27 Claims, 7 Drawing Sheets

(56) References Cited

U.S. PATENT DOCUMENTS

| | | | |
|---|---|---|---|
| 6,713,238 B1 * | 3/2004 | Chou | B82Y 10/00 264/299 |
| 6,876,776 B2 * | 4/2005 | Recht | G06T 5/30 348/349 |
| 7,027,221 B2 * | 4/2006 | Hamborg | G02B 21/244 250/201.3 |
| 7,212,660 B2 * | 5/2007 | Wetzel | G06K 9/00127 382/128 |
| 7,221,805 B1 * | 5/2007 | Bachelder | G03B 13/36 348/208.12 |
| 7,330,307 B2 * | 2/2008 | Steele | G02B 21/26 359/391 |
| 7,355,702 B2 * | 4/2008 | Yamashita | G01N 21/6458 356/301 |
| 7,456,377 B2 * | 11/2008 | Zeineh | G02B 21/365 250/201.3 |
| 7,876,500 B2 * | 1/2011 | Hattori | G02B 21/367 359/368 |
| 8,000,511 B2 * | 8/2011 | Perz | G02B 21/244 250/201.2 |
| 8,116,543 B2 * | 2/2012 | Perz | G06T 7/0081 382/128 |
| 8,120,771 B2 * | 2/2012 | Wagner-Conrad | G02B 21/0076 356/300 |
| 8,199,997 B2 * | 6/2012 | Rutenberg | G06T 5/30 382/133 |
| 8,237,785 B2 * | 8/2012 | Takagi | G01N 21/6458 348/254 |
| 8,582,924 B2 * | 11/2013 | De La Torre-Bueno | G02B 21/367 356/39 |
| 8,676,509 B2 * | 3/2014 | De La Torre-Bueno | G06Q 50/24 702/19 |
| 8,717,673 B2 * | 5/2014 | Selvin | G02B 21/16 359/368 |
| 8,817,040 B2 * | 8/2014 | Atkinson | A61B 5/0059 345/600 |
| 9,019,361 B2 * | 4/2015 | Maiya | G02B 21/367 348/79 |
| 9,036,869 B2 * | 5/2015 | Lee | G02B 21/0016 345/582 |
| 9,332,190 B2 * | 5/2016 | Murakami | H04N 5/23296 |
| 9,338,408 B2 * | 5/2016 | Kishima | H04N 7/18 |
| 9,404,737 B2 * | 8/2016 | Segale | G01N 21/6458 |
| 9,444,995 B2 * | 9/2016 | Northrup | G02B 21/365 |
| 2003/0227673 A1 * | 12/2003 | Nakagawa | G02B 21/241 359/380 |
| 2005/0280818 A1 * | 12/2005 | Yamashita | G01N 21/6458 356/318 |
| 2006/0159367 A1 * | 7/2006 | Zeineh | G02B 21/365 382/276 |
| 2006/0171582 A1 * | 8/2006 | Eichhorn | G06T 5/50 382/154 |
| 2009/0244698 A1 * | 10/2009 | Zust | G02B 21/365 359/368 |
| 2010/0265323 A1 * | 10/2010 | Perz | G02B 21/244 348/79 |
| 2010/0331205 A1 * | 12/2010 | Medoro | G01N 15/14 506/9 |
| 2011/0317260 A1 * | 12/2011 | Krueger | G02B 21/245 359/383 |
| 2012/0300293 A1 * | 11/2012 | Selvin | G02B 21/16 359/385 |
| 2013/0027538 A1 * | 1/2013 | Ding | H04N 7/183 348/79 |

\* cited by examiner

Fig. 11

METHOD AND APPARATUS FOR DEFINING A Z-RANGE IN A SAMPLE, IN WHICH A Z-STACK OF THE SAMPLE IS TO BE RECORDED BY MEANS OF A MICROSCOPE

PRIORITY

This application claims the benefit of International Application PCT/EP2012/056210 filed on Apr. 4, 2012, and German Patent Application No. 102011075809.7, filed on May 13, 2011, both of which are hereby incorporated herein by reference in their entirety.

The present invention relates to a method and an apparatus for defining a z-range in a sample, in which a z-stack of the sample is to be recorded by means of a microscope.

FIELD

In microscopy, the recording of a z-stack, or the recording of series of images in the z-direction (e.g. along the optical axis of the microscope), has been part of the state of the art for many years. In the recording of such a z-stack, a plurality of individual recordings are performed, in a defined z-range, at differing z-values (focal planes) within the z-range, in order, for example, to record an object in the sample, such as, for example, a cell, in different planes and then, on the basis of the individual recordings of the z-stack, to carry out, for example, a three-dimensional reconstruction of the z-range, and thus of the object, or to compute an image of the object with an extended depth of field.

BACKGROUND

Hitherto, the essential parameters for the recording of the z-stack have been determined by the user of the microscope. If a plurality of samples of the same kind are to be recorded in the context of an experiment, then, usually, in addition to the determination of the parameters, before commencement of the experiment, at least some parameters are reset manually before the current series of recordings. The essential parameters for the recording of the z-stack include the number of z-planes in which an image is recorded, the spacing of the individual z-planes, and the range in which the z-stack is recorded.

When the range has been defined, it then only remains necessary to define the number of z-planes or the spacing of the z-planes. The respective other parameter is then obtained taking the defined z-range into account.

The actual definition of the range in which the z-stack is to be recorded is difficult, even for experienced microscopy users, since the definition is subject to subjective impressions and, in particular, is dependent on the actual representation on the corresponding monitor screen.

Thus, for example, it is not possible to quantify by eye intensities of the object in z-planes and to subsequently reproduce this again with precision. Moreover, the step of definition is generally very time-consuming, which generally also involves an undesirably high load on the sample, since the manual setting of the upper and lower limit of the z-range can only be achieved slowly.

In addition, manual setting always involves the difficulty of large variations between the recording of a z-stack of a first sample and the recording of a z-stack of a second sample in the context of an experiment, since, instead of an objective criterion, it is only the user's optical impression of the respective sample that determines the range in which the z-stack is recorded.

SUMMARY

On this basis, it is therefore the object of the invention to provide a method or an apparatus for defining a z-range in a sample, in which a z-stack of the sample is to be recorded by means of a microscope, by means of which method or apparatus the difficulties described at the outset can be overcome as completely as possible.

According to the invention, the object is achieved by a method for defining a z-range in a sample, in which a z-stack of the sample is to be recorded by means of a microscope, wherein the z-range is defined automatically on the basis of a z-value situated in the sample and taking at least one predetermined parameter into account.

Since, in the method according to the invention, the z-range is defined automatically starting from a z-value situated in the sample (which value, in particular, represents a focal plane of the sample) and of at least one predetermined parameter, the difficulties described at the outset can be overcome. There is no longer a need for manual interaction of the user in order to define the z-range, thereby making it possible for the z-range to be defined in a rapid, satisfactory and highly reproducible manner.

In the method according to the invention, one of the predetermined parameters can be a sharpness measurement (e.g. a contrast function) of the sample, that can be determined and evaluated, for example, without intervention by a user. The z-range in the sample, in which the object to be recorded is located, can thereby be defined in a highly objective manner.

It is thus possible, for example, to define a value of the predetermined parameter that affects the extent of the z-range or that defines the limits of the z-range. This predetermined parameter is, in particular, a parameter that is not sample-dependent. This is understood here to mean that the parameter can be used with different samples, and has to be altered only rather infrequently by the user, in particular inexperienced users.

A suitable parameter value, according to the invention, is a relative percentage value x, relative to a maximum or minimum parameter value of the predetermined parameter. In the context of determination of a sharpness measurement (or a sharpness measure), the relative percentage value x indicates that a limit of the z-range has been attained when the sharpness measurement (or the sharpness measure), or the sharpness value, at a z-position has fallen to the xth percentage relative to the maximum sharpness value at the given sample position.

Naturally, in the method according to the invention, any sharpness-measurement functionals (or sharpness-measure functionals) can be used to determine a sharpness measurement (or a sharpness measure). Typically, in the case of auto-focus algorithms, these are, for example, the entropy, the sum over gradient amounts or the sum of the intensities.

Furthermore, in the method according to the invention, the z-value situated in the sample can be determined automatically, in particular by an auto-focussing method. The auto-focussing method can be used to determine the sharpest z-value (focal position) situated in the sample. Therefore, the z-range in the sample can be defined in a fully automatic manner, since the z-value situated in the sample is determined automatically and, in addition, the z-range is defined automatically on the basis of this z-value and of the parameter, e.g. of the auto-focussing method (e.g. a sharpness measurement).

In the method according to the invention, the z-range can be defined, in particular, on the basis of the data of the automatic determination of the z-value situated in the sample (e.g. the auto-focussing method, which preferably determines, as a z-value, the z-position in the sample that has the highest sharpness value (focal position)). Consequently, for example, the auto-focussing method performed in order to determine the z-value situated in the sample can also be used immediately for defining the z-range, whereby the z-range can be determined very rapidly.

Furthermore, in the method according to the invention, the upper and lower limit of the z-range can be determined symmetrically or asymmetrically in relation to the z-value situated in the sample. If the z-value is determined, for example, by an auto-focussing method, the upper and lower limit of the z-range can be determined symmetrically or asymmetrically in relation to the z-value situated in the sample (corresponding here to the focal position) through evaluation of the decrease in the sharpness value. Thus, for example, very rapid determination of the z-range is possible.

In the method according to the invention, a limit of the z-range to be defined can be determined on the basis of a predetermined value of the at least one parameter. Naturally, it is possible to specify two predetermined values of the at least one parameter, in order to determine both limits of the z-range to be defined.

If only one limit of the z-range is determined on the basis of the predetermined value of the at least one predetermined parameter, it is preferred that the z-range be determined symmetrically in relation to the z-value situated in the sample. The symmetrical determination of the z-range is particularly advantageous if the z-value situated in the sample has been determined as a sharpest z-value (focal position), by means of an auto-focussing method.

Furthermore, in the method according to the invention, the value of a characteristic quantity, which serves as the predetermined parameter for defining the z-range, can in each case be determined stepwise, with an increasing distance in the z-direction, starting from the z-value situated in the sample (in the case of the determination of the z-value by means of an auto-focussing method, the z-value situated in the sample should correspond to the focal position). The characteristic quantity can be, for example, a measurement quantity or an observable and, in particular, a sharpness measurement that is based, for example, on contrast, intensity, etc.

The stepwise determination of the value of the predetermined parameter (e.g. sharpness value) can be performed, not only in the z-direction, but also in the opposite direction (−z-direction). The step length is preferably constant, but can also vary (e.g. increase or decrease). The z-direction is, for example, the direction towards the objective lens of the microscope, such that the −z-direction is then the direction away from the objective lens. Naturally, this can also be inverted.

In the method according to the invention, after the z-range has been determined, the z-stack of the sample can be recorded in the z-range.

Furthermore, in the method according to the invention, in order to define the z-range, individual recordings of the sample are made in different z-planes, wherein at least some of the individual recordings are used for the z-stack of the sample to be recorded. Automatic definition of the z-range and, in addition, recording of the z-stack, can thus be carried out very rapidly, since individual recordings are used in order to define the z-range for the recording of the z-stack.

Furthermore, in the method according to the invention, (e.g. after recording of the z-stack of the sample), at least one further z-range can be defined automatically, in each case on the basis of a z-value situated in the sample and taking at least one predetermined parameter into account. The predetermined parameter, or the predetermined parameters, for the at least one further z-range is, or are, in particular, the same parameter as for the previously defined z-range.

The z-range can be the same sample, or the same portion of the sample and/or another sample, or another portion of the sample, which can be offset, in particular laterally, or transversely, in relation to the z-direction, relative to the previously defined z-range.

Thus, for example, a mosaic recording can be performed. It is also possible to observe the same object in a time series, or over a long period of time. In any case, the optimum z-range can be defined automatically for each z-stack. Owing to the thereby optimized number of individual recordings (not too many, not too few), the total recording duration, image data quantity and also the light loading of the sample can be reduced. It is thus possible to avoid unnecessary individual recordings within a z-stack, whereby the total recording duration, and also the light loading of the sample, can be reduced.

Naturally, the z-range need not be defined in the manner according to the invention for the recording of each z-stack. If, for example in the case of a time series, the change in the z-range from the recording of one z-stack to the next z-stack is relatively small, the z-range of the preceding z-stack can be used again. It is also possible to define the z-range of a subsequent z-stack (in a time series and/or with a spatial separation) through interpolation on the basis of at least two already defined z-ranges (e.g. through linear interpolation) or through extrapolation on the basis of at least one already defined z-range.

In particular, the recorded z-stack, or recorded z-stacks, can be used for reconstructing a three-dimensional representation of the recorded z-range, or for calculating, and preferably representing, an image of the object with an extended depth of field.

The microscope for recording the sample can be a wide-field microscope or a confocal microscope (e.g. a confocal microscope having a single-point or multi-point scanner, line scanner or spinning disc). Likewise, the microscope can operate with structured illumination and/or be designed as a fluorescence microscope. If the microscope is designed as a confocal microscope, the sharpness measurement is understood to be, in particular, the mean or summed intensity of the respective confocal recording.

The method according to the invention for defining a z-range in a sample can be used, advantageously, in fully and partially automated scanning and screening systems. Advantageously, for the user of such a system, this results in significantly less setting and configuration work.

In the case of automatic systems for recording specimens on specimen slides, the method according to the invention for defining a z-range in a sample can also be used for determining the sample thickness, or specimen thickness, at different x/y-positions. In this case, the sample thickness can be determined, at least at one x/y-position, by interpolation or extrapolation on the basis of at least one already determined sample thickness value.

In the method according to the invention, the z-value situated in the sample can be determined by means of the automatic determination of a focal plane. In this case, the magnification in the automatic determination of the focal plane can be equal to, greater than or less than the magnification used in the recording of the z-stack. The corresponding adaptation, insofar as necessary, for the recording of the z-stack can be effected automatically on the basis of the known differing magnifications. In particular, the distances of the individual z-planes (for the individual recordings) can be adapted according to the laws of optics (e.g. depth of field).

Furthermore, the method according to the invention for defining a z-range in a sample can be used, advantageously, in systems for automatic screening of multiwell plates or culture plates. Differing samples, or samples that differ in height and focal plane, can be present in different wells of a multiwell plate. For the user, an automatic configuration for each well of a multiwell plate greatly facilitates the work, and saves a large amount of time. Similarly, the method according to the invention can be used for optimum definition of the z-range at different sample positions in a single culture plate.

The object is further achieved by an apparatus for defining a z-range in a sample in which a z-stack of the sample is to be recorded by means of a microscope, wherein the apparatus has a control unit designed to define the z-range automatically on the basis of a z-value situated in the sample and taking at least one predetermined parameter into account.

By means of the apparatus according to the invention, therefore, the z-range can be defined automatically, whereby the difficulties described at the outset can be overcome.

Advantageous developments of the apparatus according to the invention are specified in the dependent claims relating to the apparatus.

In particular, the apparatus can include the microscope itself, wherein the microscope, as already described, can be a wide-field microscope, a confocal microscope or other microscope. In particular, the microscope can be designed as a fluorescence microscope.

The apparatus according to the invention can be developed such that the method according to the invention (including developments thereof) can be performed therewith. The method according to the invention can also be developed such that it has the method steps described in connection with the apparatus according to the invention (including developments thereof).

It is understood that the features mentioned above and those yet to be explained below can be used, not only in the stated combinations, but also in other combinations or singly, without exceeding the scope of the present invention.

The invention is explained exemplarily in yet more detail below with reference to the appended drawings, which also disclose features essential to the invention. There are shown in.

BRIEF DESCRIPTION OF THE DRAWINGS

DETAILED DESCRIPTION

Figure 1:
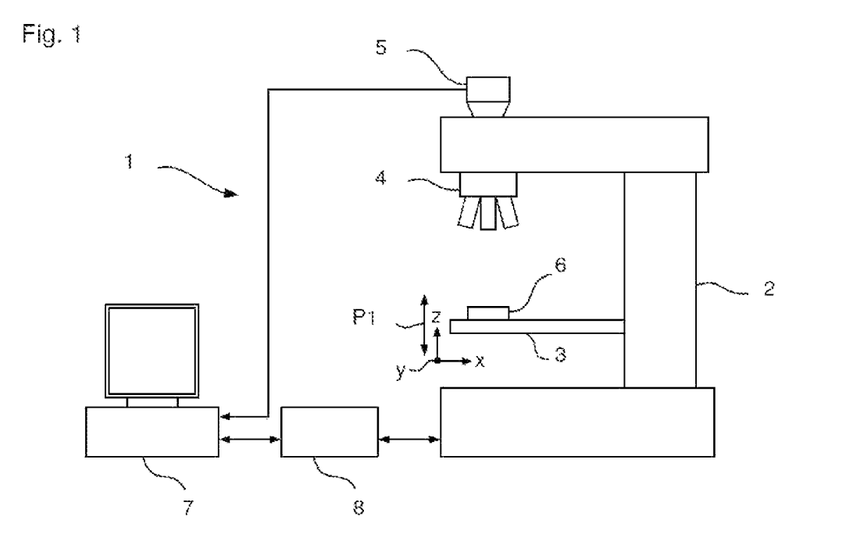
FIG. 1 a schematic representation of an embodiment of the microscope according to the invention.

In the case of the embodiment shown in FIG. 1, the microscope 1 according to the invention comprises a stand 2, which has a sample stage 3 and a microscope lens system 4 that is represented schematically as a revolving nosepiece having three objective lenses. The distance between the microscope lens system 4 (revolving nosepiece) and the sample stage 3 can be varied for setting the focal position (z-position), or for focussing, as indicated by the double arrow P1 in FIG. 1.

The microscope 1 further comprises a recording unit 5 (for example, a CCD camera), by means of which the enlarged image of a sample 6 to be examined can be recorded. The recording unit 5 is connected to a computer 7, represented schematically, which, during operation, controls the microscope 1 via a control module 8.

The microscope 1 includes a z-drive, not shown, by means of which the distance between the sample stage 3 and the microscope lens system 4 (in the z-direction) can be varied, as well as an xy-motor, not shown, for the sample stage 3, by means of which the position of the sample stage 3 in the xy-plane can be set (the y-direction extends perpendicularly in relation to the plane of FIG. 1), wherein both the z-drive and the xy-motor are controlled by means of the control module 8.

The microscope 1 according to the invention is designed such that it can be used to record series of images with differing focal positions (differing z-values) of the sample 6, or of an object within the sample 6, such as, for example, a cell to be examined, to enable a three-dimensional representation of the recorded object to be reconstructed therefrom. Such a series of images is frequently also referred to as a z-stack, wherein, in addition to the spacing of the individual z-planes, the z-range in which the z-stack is recorded is generally also to be defined.

For this purpose, in the case of the microscope 1 according to the invention, auto-focussing is first performed, during which values of a sharpness measurement or of a sharpness measure are obtained, as a function of the z-position, through the recording and subsequent evaluation of images in differing z-positions. Such a sharpness-measurement progression (or sharpness-measure progression) is represented schematically in FIG. 3a.

Figure 3A:
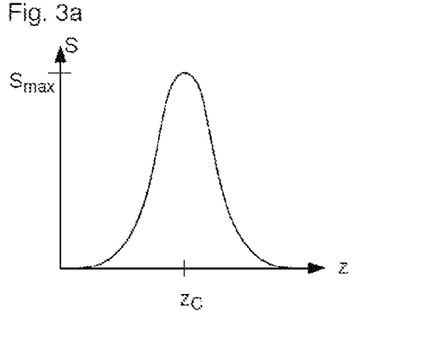
FIGS. 3a-3c schematic representations of the sharpness-measurement progression for the object 9 according to FIGS. 2a-2c.

Conventional auto-focussing methods can be used to obtain the sharpness-measurement progression. As a sharpness measurement, it is possible to use, for example, a scalar functional $S(B(x,y,z))$ that, for each image $B(x,y,z)$ recorded by means of the recording unit 5, provides a scalar value (the sharpness-measurement value), which increases as the image sharpness increases (as shown in FIG. 3a) and has an extreme value at a maximum image sharpness. Naturally, it is also possible for the scalar functional to be constructed such that the sharpness-measurement value decreases as the image sharpness increases, and there is a minimum value at a maximum image sharpness. Since the functionals S are generally constructed such that they have a maximum at a maximum image sharpness, this is taken as the basis in the description that follows.

The sharpness functionals S provide a scalar as a sharpness-measurement value, since, in the computation rule of the respective sharpness functional, summation, or integration, is performed over the two recording dimensions of the two-dimensional recording. For a given image portion, therefore, the scalar sharpness-measurement value depends substantially only on z, and consequently on the focal position. For a given image portion, therefore, the functional S can be considered to be dependent on the focal position z (thus S(z)).

Figure 2A:
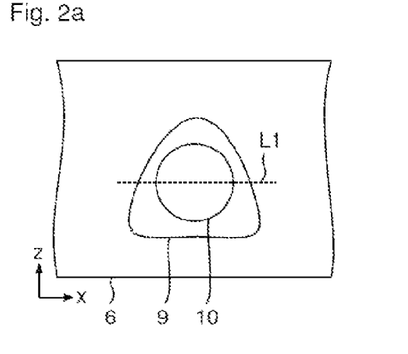
FIGS. 2a-2c sectional representations of an object 9 to be recorded in a sample 6, wherein different z-recording planes are indicated.

Here, the maximum sharpness-measurement value $S_{max}$ is at the z-position $z_C$, which corresponds to the z-plane indicated by the line L1 (FIG. 2a), wherein, here, an xz-section through the sample 6 is represented schematically, and the object to be recorded is to be the nucleus 10 of a cell 9, which is represented schematically. As shown by the representation in FIG. 2a, the z-plane having the z-value $z_C$ is located exactly in the middle of the nucleus 10.

Since the performed auto-focussing produces the sharpness-measurement progression shown in FIG. 3a, this progression, in addition to being used to determine the z-plane having the greatest sharpness, can likewise be used to automatically define the upper and lower limit of the z-range for the z-stack. The sharpness measurement (sharpness functional) S is therefore a predetermined parameter for definition of the z-range.

Figure 2B:
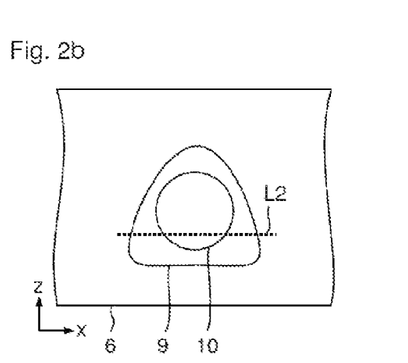

In the case of the embodiment described here, the z-value $z_L$, at which the sharpness value is $S_{mid}=S_{max}\cdot 50\%$, is defined as the lower limit. The position of the corresponding z-plane is indicated in FIG. 2b by the line L2.

Figure 2C:
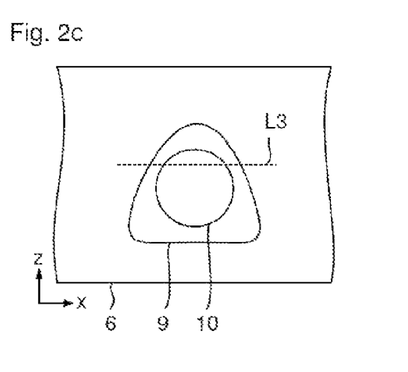

The upper limit of the z-range is determined in the same way. Here also, the sharpness-value is to be $S_{mid}=S_{msax}\cdot 50\%$, such that the z-value $z_R$ is determined. The corresponding position of the z-plane is indicated by the line L3 in the representation of FIG. 2c.

The z-range (in this case, from $z_L$ to $z_R$) can thus be defined automatically, without intervention by the user. The thus defined z-range can then be used as a basis for automatically determining and setting the optimum section spacing (z-distance for the individual recordings of the z-stack), by means of the computer 7. Parameters of the recording such as, for example, the numerical aperture of the microscope optical system 4, etc., are preferably taken into account, in the known manner.

Naturally, the percentage value need not be 50%, but can also assume other values. In particular, the percentage values for determination of the sharpness-measurement limit values for the upper and lower limit value $z_L$, $z_R$ can differ.

A predetermined parameter (the sharpness functional) and two values of the predetermined parameter (which each indicate the decrease in the sharpness value relative to the maximum sharpness value for the upper and lower limit of the z-range to be defined) are thus specified for automatically defining the z-range.

The thus determined recording parameters (i.e., the z-range and the z-distance) are then used in recording the desired z-stack of the nucleus 10 by means of the microscope 1 (thus, a plurality of individual recordings are created within the determined z-range and at the determined z-distance), to enable, for example, a three-dimensional representation of the nucleus 10 to be generated therefrom.

The images of the sample 6 recorded for auto-focussing are generally of a lower resolution than the images then recorded for the z-stack, thereby enabling auto-focussing to be performed rapidly, with little loading of the sample 6.

Figure 4:
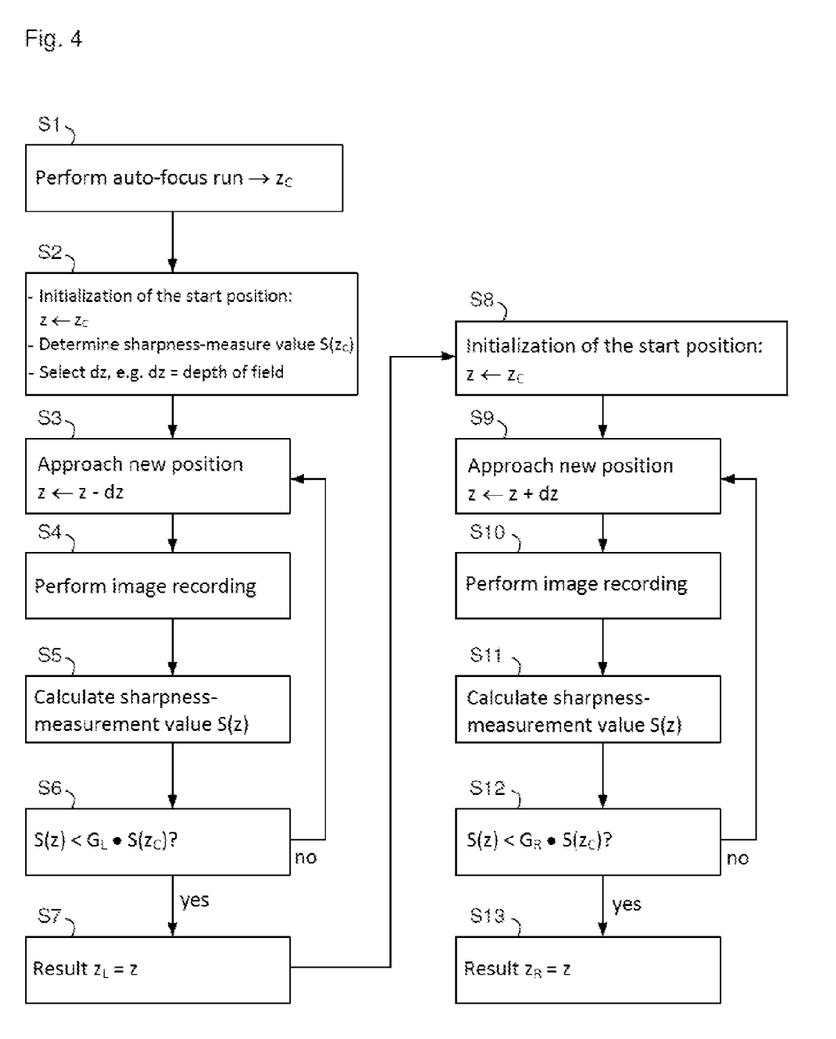
FIG. 4 a flow diagram of a further embodiment of the method according to the invention.

A modification for determination of the z-range is described below in connection with FIG. 4. Firstly, an auto-focus run is performed, in order to determine the z-value $z_C$ of greatest image sharpness (step S1). For this, it is possible to use the auto-focussing described in connection with FIG. 3a, or also any other known method.

In the subsequent step S2, the start position is initialized (here, $z_C$ is selected as the start position z), the sharpness-measurement value $S(z_C)$ is determined, and the step width dz is selected, wherein, for example, the depth of field of the microscope 1, or of the microscope lens system 4 used, can be selected as the step width dz. As a sharpness measurement S(z) it is possible to use, for example, a scalar sharpness functional that, for example, takes account of entropy measures, an image-frequency analysis or performs a simple sum over gradients. Basically, all image sharpness measurements that are suitable for conventional auto-focussing algorithms are also suitable for the sharpness functional S according to step S2.

Steps S3 to S6 are then performed in succession, wherein the value $G_L$ is used to determine the lower, or left, limit of the z-range and here has a value of, for example, 0.5. Further recordings are performed for as long as the sharpness-measurement value S(z) for the image recordings performed at the differing positions is greater than $G_L \cdot S(z_C)$. Once these conditions are no longer fulfilled, the present z-value is the value of the lower limit $z_L$.

Once this limit value has been determined (step S7), steps S8-S13 are performed in order to determine the upper limit value $z_R$. Here again, 0.5 is used as a value for $G_R$ in step S12. Naturally, the values $G_L$ and $G_R$ need not be equal, but can also differ.

After steps S1-S13 have been performed, the two limit values of the z-range are determined automatically, such that the z-range has been defined automatically. The z-stack can then be recorded in the known manner.

In order to increase the speed of definition of the z-range, the steps S8 to S13 can be omitted, in order to determine the value $z_R$. In this case, it is possible to define, for example, a symmetrical z-range around $z_C$, by means of the following equation $z_R = z_C + (z_C - z_L)$.

In the case of the Steps S3 and S9, the depth of field of the microscope lens system 4 used has been selected as the step width. Naturally, lesser or greater step widths are also possible. If a greater accuracy is desired, a lesser step width can be selected, wherein values up to half the depth of field are advantageous. If a higher speed is desired for determining the z-range, a greater step width can be selected. This can be, for example, up to 1.5 times the depth of field.

In the determination of the z-range, described in connection with FIG. 4, instead of an auto-focus run in step S1, any z-value within the cell 9 can be specified. Owing to steps S2 to S13, even if the z-value is not located in the plane of optimum sharpness, the relevant and desired z-range can be defined extremely accurately.

If a mosaic recording is to be made of the cell 9, or of another object to be recorded, the definition of the z-range, according to the invention, can be performed separately for each mosaic element, thereby avoiding unnecessary individual recordings, as described in detail below.

Figure 5:
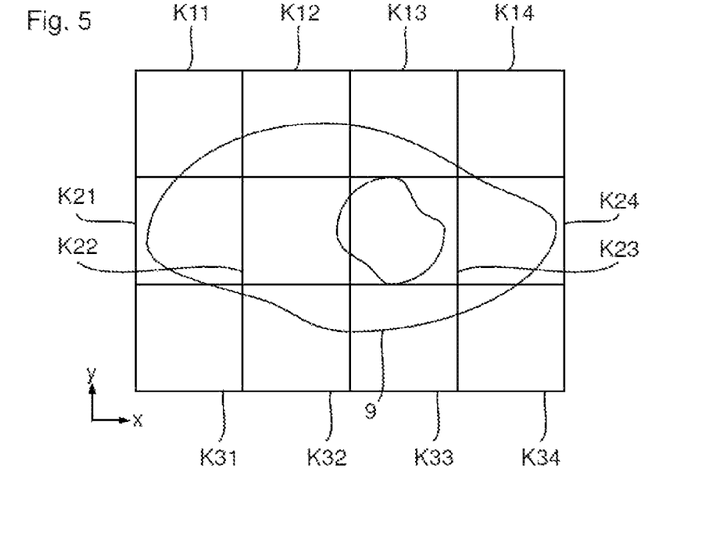
FIG. 5 a plan view to explain a mosaic recording of the cell 9.
Figure 6:
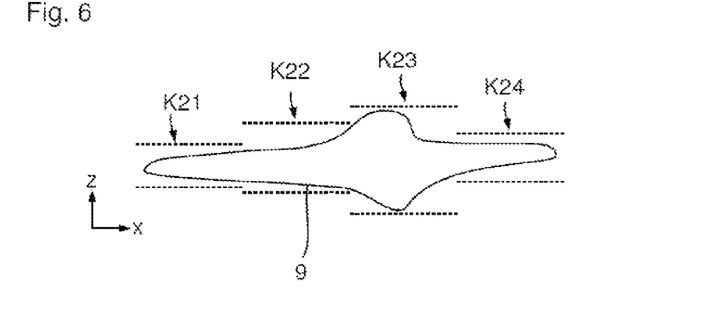
FIG. 6 a side view for the mosaic portions K21-K24.

A plan view of the object 9 to be recorded is shown in FIG. 5, in which twelve mosaic portions K11-K33 are indicated, wherein, in each of the mosaic portions K11-K33, a recording of a z-stack is to be performed by means of the microscope 1 (FIG. 1). FIG. 6 shows a side view of the object 9 to be recorded, in the region of the mosaic portions K21, K22, K23, and K24. Since, before the recording, the z-range is defined automatically, in the manner described, for each of the mosaic portions K21-K24, the z-range has been optimally defined for the mosaic portion K21-K24, as shown by the broken lines in FIG. 6, which represent the upper and lower limit of the z-range.

Figure 7:
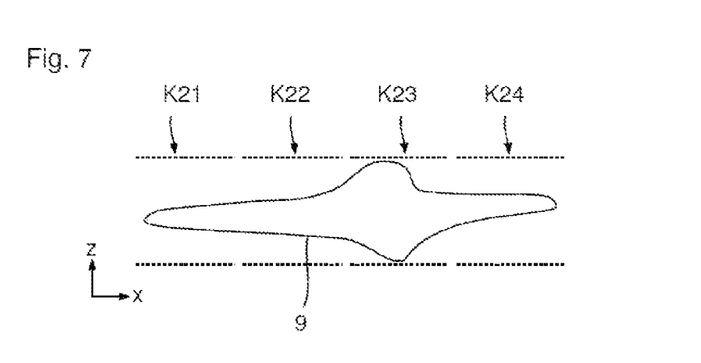
FIG. 7 a side view as in FIG. 6 to explain the procedure known hitherto.

FIG. 7, for comparison, gives the solution known hitherto, in which the definition of the z-range is performed before commencement of the measurement. In this case, of course, the z-range is defined on the basis of the portion of the cell 9 that has the greatest z-extent, as represented schematically in FIG. 7. This has the disadvantageous result that, for example in the mosaic portion K21, unnecessary individual recordings, which do not include the actual cell 9, are performed in the recording of the corresponding z-stack. This results overall in an unnecessarily long measuring time, and also in a high degree of unnecessary load upon the sample due to individual recordings that are actually not necessary.

In mosaic recording, automatic definition of the z-range can be performed for each mosaic portion K11-K34, as has been described. It is also possible, however, for the z-range not to be defined automatically, in the stated manner, for each mosaic portion K11-K34. For example, the z-range can be defined, for at least one mosaic portion (here, for example, the mosaic portion K12), through interpolation from the already defined z-ranges of two or more adjacent mosaic portions (for example, the mosaic portions K11 and K13). Definition is also possible by means of extrapolation based on at least one already defined z-range.

Figure 8:
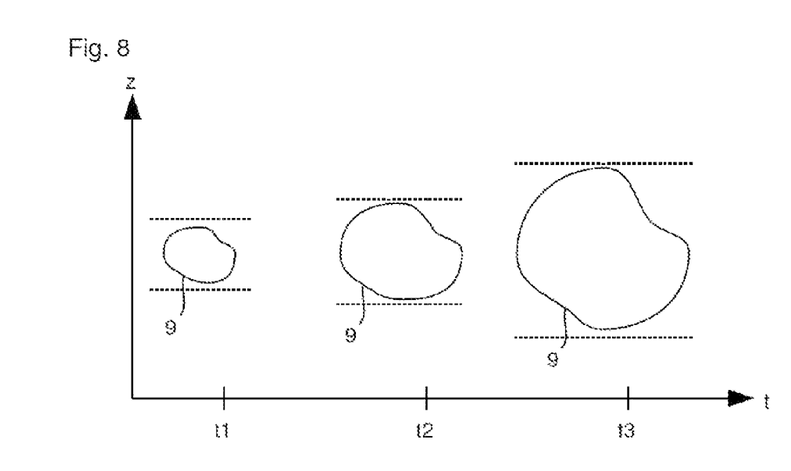
FIG. 8 a representation to explain the determination of the z-range for a cell the z-extent of which increases with time.

A further example of the advantageous application of the method according to the invention for defining a z-range is described in connection with FIG. 8. There, the cell 9 to be recorded is represented schematically at three different points in time t1, t2 and t3, wherein it is assumed that the cell 9 grows, such that, inter alia, its extent in the z-direction increases with the progression of time.

According to the invention, therefore, before a z-stack is recorded (preferably before each recording of a z-stack), the z-range is defined automatically, according to the invention, such that there are always optimally adapted limits for the z-range at all points in time t1-t3, as represented by the broken lines, which are intended to represent the upper and lower limit.

Figure 9:
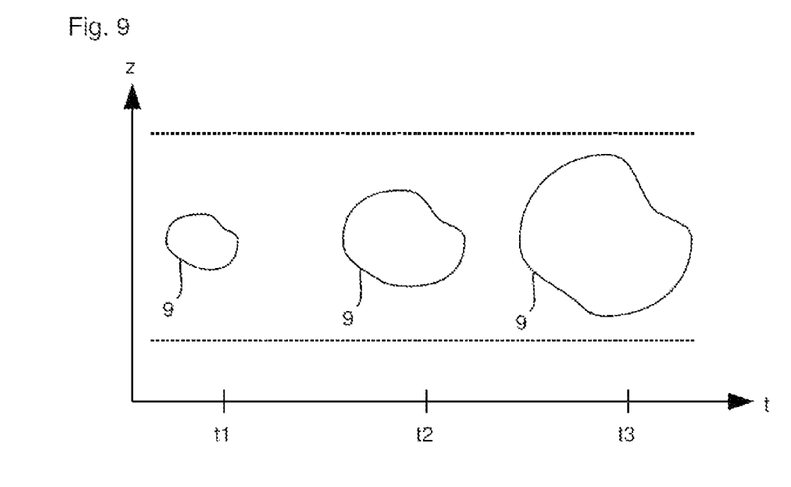
FIG. 9 a representation as in FIG. 8 to explain the procedure known hitherto.

In comparison with this, the conventional approach is shown in FIG. 9. Hitherto, it has been necessary to assume the greatest extent in the z-direction in dependence on the time t, and to determine the z-range on that basis. This results in the z-range selected for the points in time t1 and t2 being much too large, such that, again, unnecessary individual recordings are performed during the recording of a z-stack, which prolong the measuring time and involve an undesirable load upon the sample. Moreover, a certain safety distance must be provided, such that the upper and lower limit at the time point t3 is at too great a distance from the cell 9. This therefore has the result that, even at the time point t3, unnecessary individual recordings are made in z-portions above and below the cell 9, and these unnecessary individual recordings in these z-portions are also performed at the points in time t1 and t2.

Figure 10:
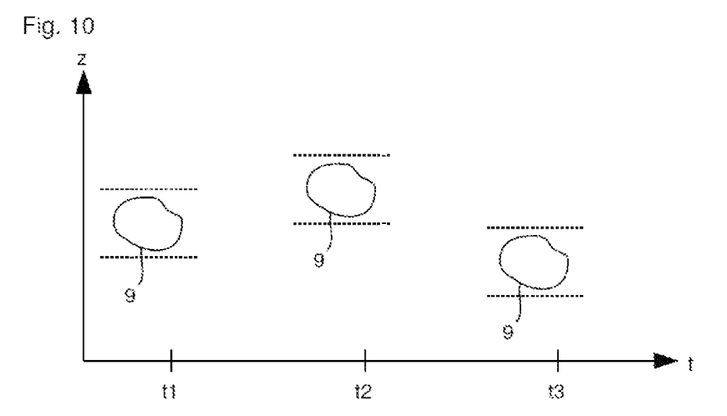
FIG. 10 a representation to explain the determination of the z-range for a cell 9 that changes its z-position with time.

FIG. 10 shows the case in which the position of the cell 9 in the z-direction changes in dependence on time. This can be the case, for example, if the cell 9 is in a culture solution, such that fixing in the z-direction is not possible, or is possible only with great difficulty. With the definition of the z-range according to the invention, however, this is not problematical, since the optimum z-range is always defined automatically before the measurement is performed, as is again represented by broken lines, which indicate the upper and lower limit of the z-range. The optimum z-range is determined and defined at each of the shown points in time t1, t2 and t3, such that the z-stack can then be recorded at these points in time t1-t3.

Figure 11:
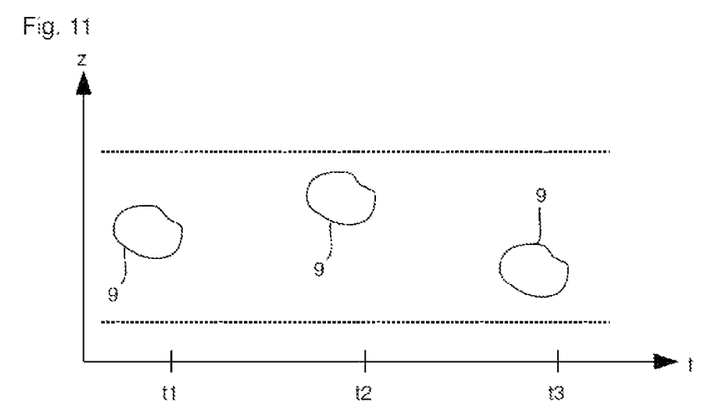
FIG. 11 a representation as in FIG. 10 to explain the procedure known hitherto.

The former approach consisted of making an assumption about the minimum and maximum z-values of the cell 9 that occur during the measurement, and in defining the z-range on that basis which, for example, leads to the limits shown in FIG. 11 (which, again, are represented by broken lines). Recordings of the z-stack at the times t1, t2 and t3 then result in a plurality of unnecessary individual recordings, since the limits are at a great distance from the cell 9, compared with the representation of FIG. 10.

Naturally, the advantageous embodiments described in connection with FIGS. 5 to 11 can also be combined with each other in any manner.

Figure 3B:
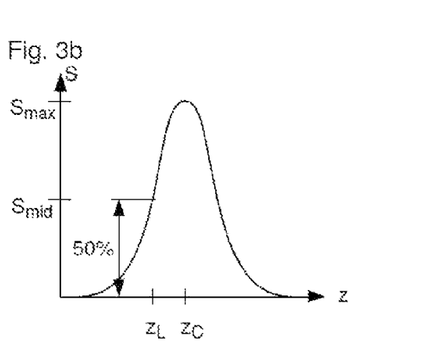
Figure 3C:
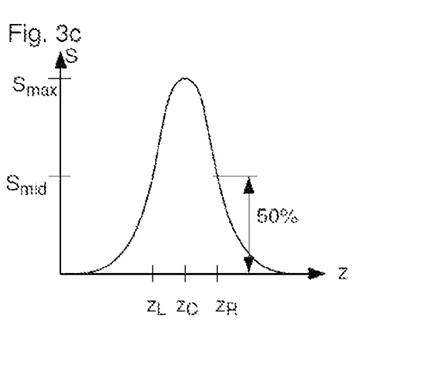
Figure 12:
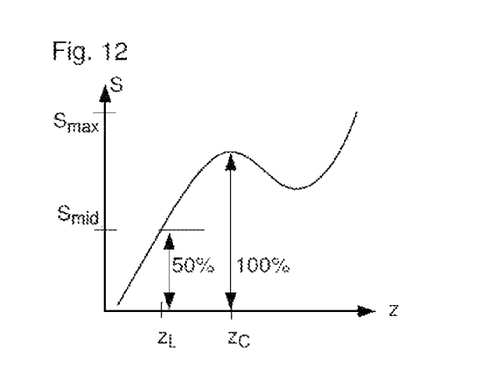
FIG. 12 a representation of a non-Gaussian sharpness progression for determining the z-range, and FIG. 13 a further representation of a non-Gaussian sharpness progression for determining the z-range.

In FIG. 12, the sharpness measurement S is represented in a manner similar to that in FIG. 3b, wherein a non-Gaussian sharpness progression is assumed in the case of FIG. 12. In this case, for example, the lower limit of the z-range can be determined by the 50% drop in the sharpness-measurement value relative to the local maximum value, as indicated in FIG. 12. Since the sharpness progression rises in the direction of increasing z-values and does not fall again, or lies above a preset threshold value, the search limit of the auto-focus routine can be used, e.g. automatically, as upper limit for the z-range. Alternatively, it is possible to determine the upper limit on the basis of the determined lower limit.

Figure 13:
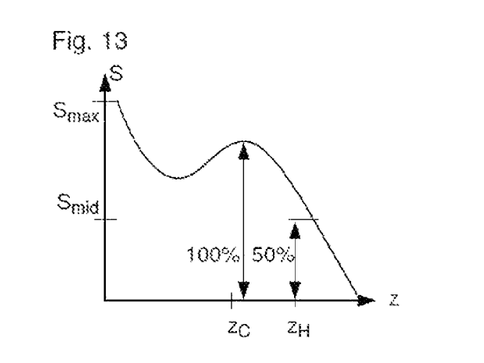

FIG. 13 shows the case in which, owing to the sharpness progression, only the upper limit can be determined. In this case, the lower limit is then determined, in a manner similar to that for the upper limit in the case of the variant according to FIG. 12.

The described manner of determining the z-range is based on this determination being performed for one recording channel of the microscope 1. If the sample 9 is dyed, e.g. with marking substances of differing fluorescence, the z-range can be defined separated for each recording channel, and the recording of the z-stack for the corresponding channel can also be performed with the associated z-range.

In the embodiments described, it has been assumed that the microscope 1 is designed as a wide-field microscope. Naturally, the microscope 1 need not be a wide-field microscope. For example, the microscope 1 can be designed as a confocal microscope. In this case, the terms mean intensity and mean intensity value can be used, instead of the terms sharpness measurement and sharpness-measurement value. All other aspects can be realized in the same manner, or in a similar manner, as in the embodiments described above.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A Method for automatically defining a z-range in a sample in which a z-stack of the sample is to be recorded by means of a microscope, comprising:
   (a) defining an initial z-value start position situated in the sample;
   (b) defining a step width;
   (c) automatically de-incrementing a z-plane value by the step width;
   (d) automatically performing an evaluation of the sample at the z-plane to determine whether a predetermined parameter for an image of the sample recorded at the z-plane value is within a predetermined range;
   (e) repeating steps (c) and (d) automatically until the image parameter being evaluated is no longer within the predetermined range;
   (f) defining automatically a lower limit of the z-range as the z-plane value achieved in step (c) just prior to the predetermined parameter being evaluated in step (d) no longer falls within the predetermined range; and
   (g) defining at least one further z-range automatically utilizing at least steps (a) and (c)-(f), wherein the at least one further z-range is defined for the same portion of the sample for which the previously defined z-range was defined, wherein the respective z-ranges are defined at different points in time.

2. The Method according to claim 1, in which the predetermined parameter is a sharpness measurement.

3. The Method according to claim 1, in which the predetermined parameter is a contrast function.

4. The Method according to claim 1, in which the initial z-value start position situated in the sample is defined automatically by performing an auto-focusing routine.

5. The Method according to claim 4, in which a data of the automatic determination of the initial z-value start position situated in the sample is also used for determining the z-range.

6. The Method according to claim 1, in which the upper limit of the z-range is defined as a numerical difference between the lower limit of the z-range and the initial z-value start position that is added to the initial z-value start position.

7. The Method according to claim 1, in which the upper limit of the z-range is defined by the steps comprising:
   ((h)) automatically returning to the initial z-value start position;
   ((i)) automatically incrementing the z-plane value by the step width;
   ((j)) performing the evaluation of the sample at the z-plane according to step (d) automatically;
   ((k)) repeating steps (i) and (j) automatically until the image parameter being evaluated is no longer within the predetermined range; and
   ((l)) defining automatically the upper limit of the z-range as the z-plane value achieved in step ((i)) just prior to the predetermined parameter being evaluated in step (d) no longer falls within the predetermined range.

8. The Method according to claim 1, in which the value of the predetermined parameter is in each case determined stepwise, with an increasing distance in the z-direction, starting from the initial z-value start position situated in the sample.

9. The Method according to claim 1, in which, after the z-range has been automatically defined, the z-stack of the sample is recorded in the z-range.

10. The Method according to claim 1, wherein for defining the z-range, individual recordings of the sample are made in different z-planes, wherein at least some of the individual recordings are used for the z-stack of the sample to be recorded.

11. The Method according to claim 1, in which an extent of the sample in the z-direction is determined automatically, including performing steps (c)-(e).

12. A Method for automatically defining a z-range in a sample in which a z-stack of the sample is to be recorded by means of a microscope, comprising:
   (a) defining an initial z-value start position situated in the sample;
   (b) defining a step width;
   (c) automatically de-incrementing a z-plane value by the step width;
   (d) automatically performing an evaluation of the sample at the z-plane to determine whether a predetermined parameter for an image of the sample recorded at the z-plane value is within a predetermined range;
   (e) repeating steps (c) and (d) automatically until the image parameter being evaluated is no longer within the predetermined range;
   (f) defining automatically a lower limit of the z-range as the z-plane value achieved in step (c) just prior to the predetermined parameter being evaluated in step (d) no longer falls within the predetermined range; and
   (g) defining at least one further z-range automatically utilizing at least steps (a) and (c)-(f), wherein, the at least one further z-range is defined for a portion of the sample that is offset laterally in relation to the portion of the sample for which the previously defined z-range was defined.

13. The Method according to claim 12, in which a second further z-range is defined for the same portion of the sample for which the z-range has already been previously defined.

14. The Method according to claim 12, in which, after the at least one further z-range has been defined, the z-stack of the sample is recorded, in the at least one further z-range.

15. An Apparatus for automatically defining a z-range in a sample, in which a z-stack of the sample is to be recorded by means of a microscope, the apparatus comprising:
   a microscope control unit configured to:
   (a) define an initial z-value start position situated in the sample;
   (b) define a step width;
   (c) automatically de-increment a z-plane value by the step width;
   (d) automatically perform an evaluation of the sample at the z-plane to determine whether a predetermined parameter for an image of the sample recorded at the z-plane value is within a predetermined range;
   (e) repeat elements (c) and (d) automatically until the image parameter being evaluated is no longer within the predetermined range;
   (f) define automatically a lower limit of the z-range as the z-plane value achieved in element (c) just prior to the predetermined parameter being evaluated in element (d) no longer falls within the predetermined range; and (g) define automatically at least one further z-range utilizing at least elements (a) and (c)-(f), wherein the at least one further z-range is defined for the same portion of the sample for which the previously defined z-range was defined, and wherein the respective z-ranges are defined at different points in time.

16. The Apparatus according to claim 15, in which the predetermined parameter is either a sharpness measurement or a contrast function of the sample.

17. The Apparatus according to claim 15, further comprising a determination unit, the determination unit configured to determine the initial z-value start position situated in the sample via an auto-focussing method, and to communicate the initial z-value start position to the control unit.

18. The Apparatus according to claim 17, in which the control unit is further configured to utilize data of the determination unit for defining the z-range.

19. The Apparatus according to claim 15, in which the control unit is further configured to define an upper limit of the z-range as a numerical difference between the lower limit of the z-range and the initial z-value start position that is added to the initial z-value start position.

20. The Apparatus according to claim 15, in which the control unit is further configured to define an upper limit of the z-range by the steps comprising:
   ((h)) automatically returning to the initial z-value start position;
   ((i)) automatically incrementing the z-plane value by the step width;
   ((j)) performing the evaluation of the sample at the z-plane according to step (d) automatically;
   ((k)) repeating steps (i) and (j) automatically until the image parameter being evaluated is no longer within the predetermined range; and
   ((l)) defining automatically the upper limit of the z-range as the z-plane value achieved in step ((i)) just prior to the predetermined parameter being evaluated in step (d) no longer falls within the predetermined range.

21. The Apparatus according to claim 15, in which the control unit is further configured to determine the value of the predetermined parameter stepwise in each case, with an increasing distance in the z-direction, starting from the initial z-value start position situated in the sample.

22. The Apparatus according to claim 15, further comprising the microscope which, after the z-range has been defined, automatically records the z-stack of the sample in the z-range.

23. The Apparatus according to claim 15, in which, in order to define the z-range by means of the microscope, a plurality of individual recordings of the sample are made in different z-planes, wherein the control unit is further configured to utilize at least some of the plurality of individual recordings for the z-stack of the sample to be recorded.

24. The Apparatus according to claim 15, in which the control unit is further configured to automatically determine an extent of the sample in the z-direction, including utilizing at least elements (c)-(e).

25. An Apparatus for automatically defining a z-range in a sample, in which a z-stack of the sample is to be recorded by means of a microscope, the apparatus comprising:
   a microscope control unit configured to:
      (a) define an initial z-value start position situated in the sample;
      (b) define a step width;
      (c) automatically de-increment a z-plane value by the step width;
      (d) automatically perform an evaluation of the sample at the z-plane to determine whether a predetermined parameter for an image of the sample recorded at the z-plane value is within a predetermined range;
      (e) repeat elements (c) and (d) automatically until the image parameter being evaluated is no longer within the predetermined range;
      (f) define automatically a lower limit of the z-range as the z-plane value achieved in element (c) just prior to the predetermined parameter being evaluated in element (d) no longer falls within the predetermined range; and
      (g) define automatically at least one further z-range utilizing at least elements (a) and (c)-(f), wherein the at least one further z-range is defined for a portion of the sample that is offset laterally in relation to the portion of the sample for which the previously defined z-range was defined.

26. The Apparatus according to claim 25, in which the control unit is further configured to automatically define a second further z-range for the same portion of the sample for which the z-range has already been previously defined.

27. The Apparatus according to claim 25, in which the microscope, after the at least one further z-range has been defined, is configured to record the z-stack of the sample in at least one further z-range.

* * * * *